United States Patent [19]
Weyand et al.

[11] 3,752,596
[45] Aug. 14, 1973

[54] HYDROSTATIC SUPPORT FOR LONGITUDINALLY DRIVEN MACHINE POST

[75] Inventors: Manfred Weyand, Meerbusch; Manfred Picker, Buttgen, both of Germany

[73] Assignee: Schiess Aktiengesellschaft, Dusseldorf-Oberkassel, Germany

[22] Filed: Apr. 10, 1972

[21] Appl. No.: 242,452

[30] Foreign Application Priority Data
Apr. 10, 1971 Germany.................. P 21 17 701.5

[52] U.S. Cl..................... 408/234, 74/468, 90/11 R, 308/5 R
[51] Int. Cl. ......................... B23c 9/00, B23b 47/00
[58] Field of Search..................... 408/234; 308/5 R; 74/441, 424.6, 409, 468; 90/11 R, 15

[56] References Cited
UNITED STATES PATENTS
3,582,159   6/1971   Uhtenwoldt......................... 308/5 R
3,415,138   12/1968  Rumbarger et al. ............... 74/468 X
3,466,951   9/1969   Greenberg ..................... 308/5 R X Primary Examiner—Gil Weidenfeld
Attorney—Walter Becker

[57] ABSTRACT

A machine tool with an upright post which is displaceable on a stationary machine tool bed in the longitudinal direction thereof by a worm rotatably journalled in said post and meshing with a worm gear rack connected to the machine tool bed. The foot portion of the post has supporting surfaces by means of which it is horizontally slidably and vertically movably supported on the bed, which supporting surfaces are provided with groups of pressure fluid receiving pockets, the pockets of each group being arranged one behind the other in the longitudinal direction of the bed while being open toward the bed. The foot portion of the post is also provided with two oppositely located lateral guiding surfaces one of which engages one lateral surface of the worm gear rack for laterally guiding the post. This one lateral guiding surface has one pressure fluid receiving pocket which through passages in the worm gear rack communicates with the flanks of the respective teeth of the worm gear rack which are being engaged by the worm.

1 Claim, 9 Drawing Figures

Patented Aug. 14, 1973

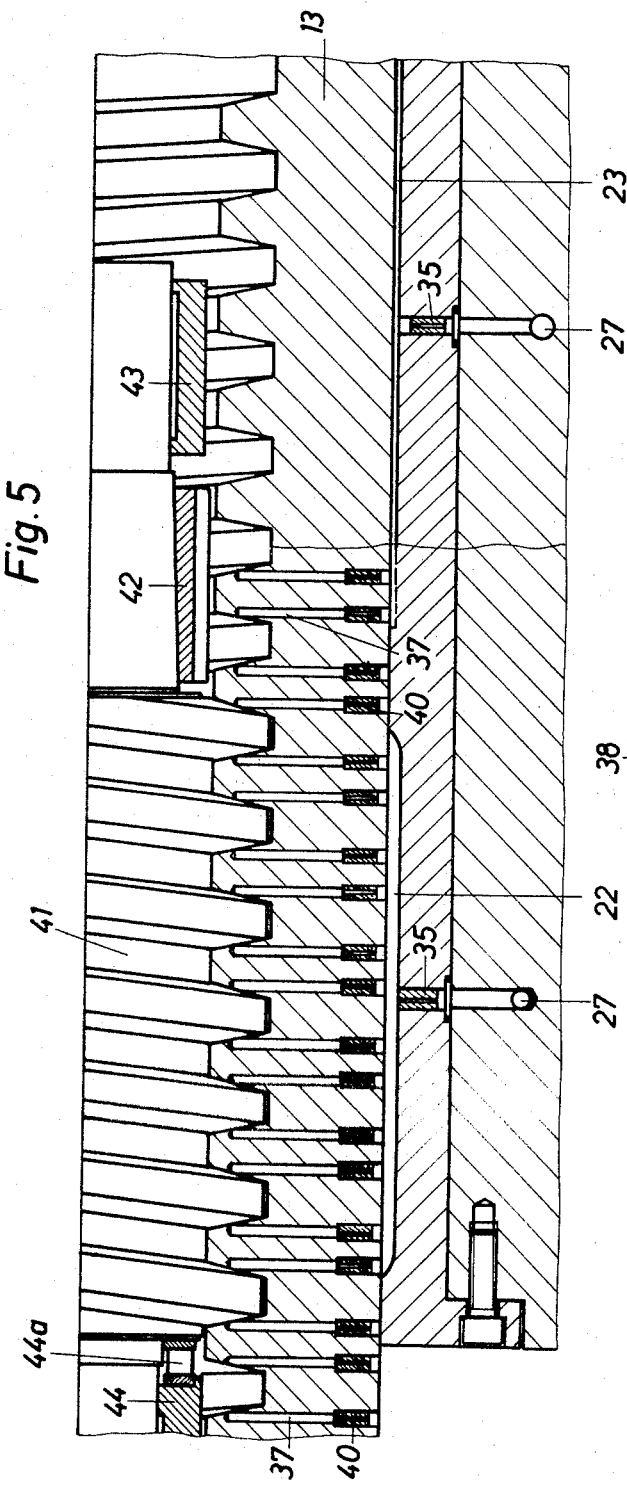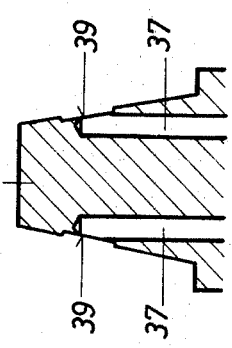

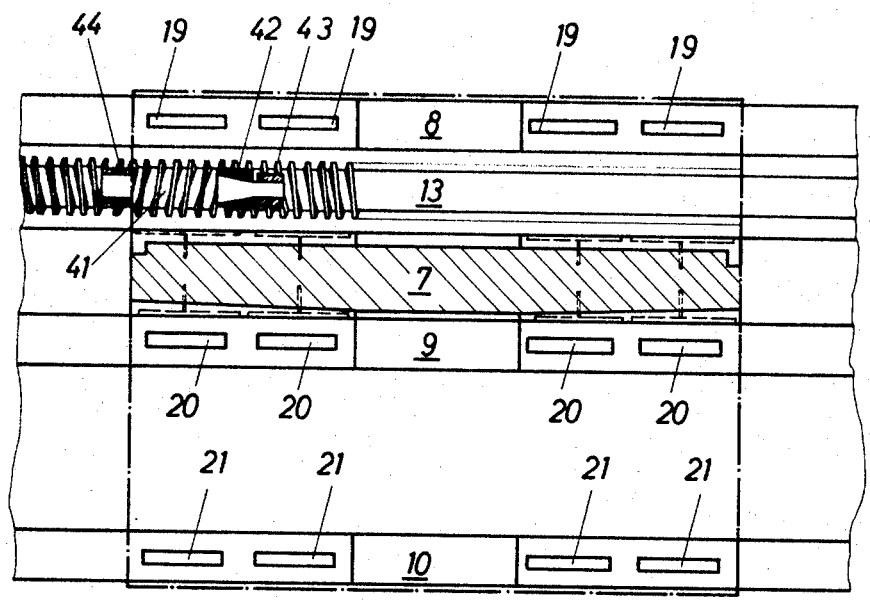
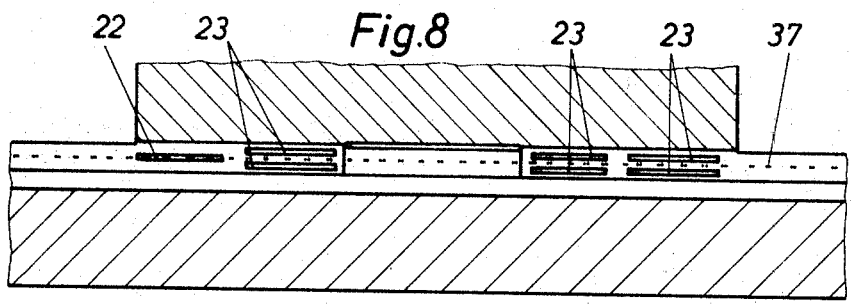
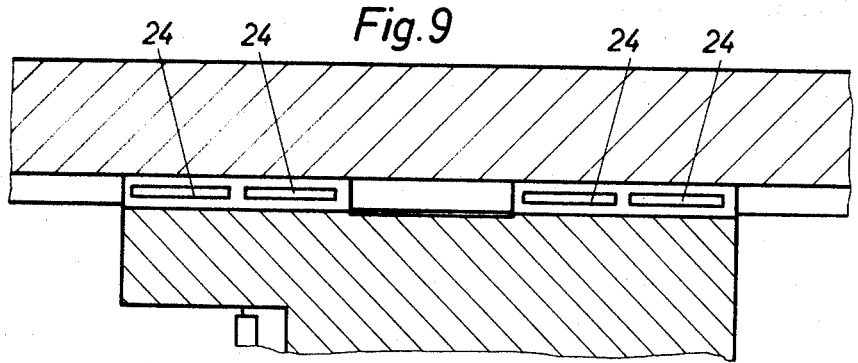

HYDROSTATIC SUPPORT FOR LONGITUDINALLY DRIVEN MACHINE POST

The present invention relates to a machine tool post longitudinally displaceable on a bed which post for purposes of its displacement engages a worm gear rack by means of a rotatable worm, the worm gear rack extending along the bed for the post. More specifically, the present invention concerns a machine tool post of the just described type which hydrostatically rests and is guided on the bed, on one hand, vertically and, on the other hand, transverse thereto on two lateral guiding surfaces which are located opposite to each other. The supporting and guiding surfaces comprise pressure fluid pockets in the form of longitudinal grooves arranged one behind the other which pressure fluid pockets receive the pressure means and the lubricant through the foot of the post from a source of pressure fluid.

When supporting and journalling movable elements of machine tools on plane guiding surfaces, the requirement has to be met that a lubricant film be maintained between the surfaces which are moving relative to each other. This may be effected by means of the so-called hydrodynamic lubrication according to which the lubricant is distributed between the surfaces moving upon and relative to each other so that these surfaces are spaced from each other by the thickness of the respective lubricant film. This requirement of lubrication has the drawback that the thickness of the lubricant film depends on the quantity of the introduced lubricant and on the speed of the surfaces moving upon and relative to each other so that the thickness of the lubricant film will vary accordingly. Such a situation may, particularly when heavy machine tools are involved, cause machining errors the magnitude of which depends on the magnitude of these variations. On the other hand, the support of movable machine elements of machine tools on plane surfaces may be effected by means of the so-called hydrostatic mounting according to which one of the movable surfaces has pressure fluid pockets machined into one of the surfaces which are moving one upon the other, the pressure fluid pockets being supplied with a lubricant under pressure. Inasmuch as the pressure and the quantity of the pressure fluid can be controlled precisely, it is possible to have the movable machine element so to speak float and move on pressure cushions of precisely adjustable height, while the speed will not affect the thickness of the pressure cushion because the thickness of the pressure cushion can be controlled and maintained at the predetermined height by corresponding measurements.

The present invention is based on such hydrostatic support of a machine post which is longitudinally displaceable on a post bed. More specifically, the object underlying the present invention consists in coordinating the steps required by the hydrostatic support and guiding of the post with the steps by means of which the worm gear rack is to be supplied with lubricant exclusively within the range of engagement of the worm.

This object and other objects and advantages of the invention will appear more clearly from the following specification in connection with the accompanying drawings, in which:

FIG. 5 is a longitudinal section through a portion of the gear rack in the engaging range of the worm.

FIG. 6 illustrates on a larger scale than that of FIG. 5 a section through a tooth of the gear rack.

FIG. 7 is a section taken along the line VII — VII of FIG. 2, but on a smaller scale than that of FIG. 2.

FIG. 8 shows the arrangement of the pressure fluid pockets in the left-hand guiding strip of FIG. 3.

FIG. 9 illustrates the arrangement of the pressure fluid pockets in the right-hand guiding strip of FIG. 3.

The present invention is characterized primarily in that one of the two lateral supporting and guiding surfaces of the post directly engages one lateral surface of the worm gear rack and that the length of the pressure fluid pocket provided in the gear rack within the region of the worm approximately corresponds to the length of the worm. The invention is furthermore characterized in that at the level of the pressure pocket and over the entire length of the worm gear rack bores extend transverse through the worm gear rack, the bores being provided with throttles or chokes while at least one bore leads into each tooth flank.

In view of this design it will be assured that the pressure fluid pocket associated with the worm gear rack will see to it that always in the region between the lateral supporting and guiding surface of the post and the associated lateral surface of the gear rack there will be present a lubricant cushion which is adapted to be controlled at to the thickness thereof. At the same time the pressure fluid pocket permits the lubricant to pass through the respective bores in the rack in the range of this pocket and to reach the tooth flanks, whereby the engagement range between gear rack and worm is supplied with lubricant. Inasmuch as the worm forms a part of the post, in other words is mounted and driven in the latter, pressure fluid pocket and worm will during the displacement of the post remain in the same position relative to each other and there will always only that section of the rack be supplied with lubricant which is in engagement with the worm. As a result thereof, the losses in lubricant are very low while it is of particular advantage that the lubricant supply system for the worm is connected to the pressure and lubricant supply system of the supporting and guiding surfaces of the post.

Figure 1:
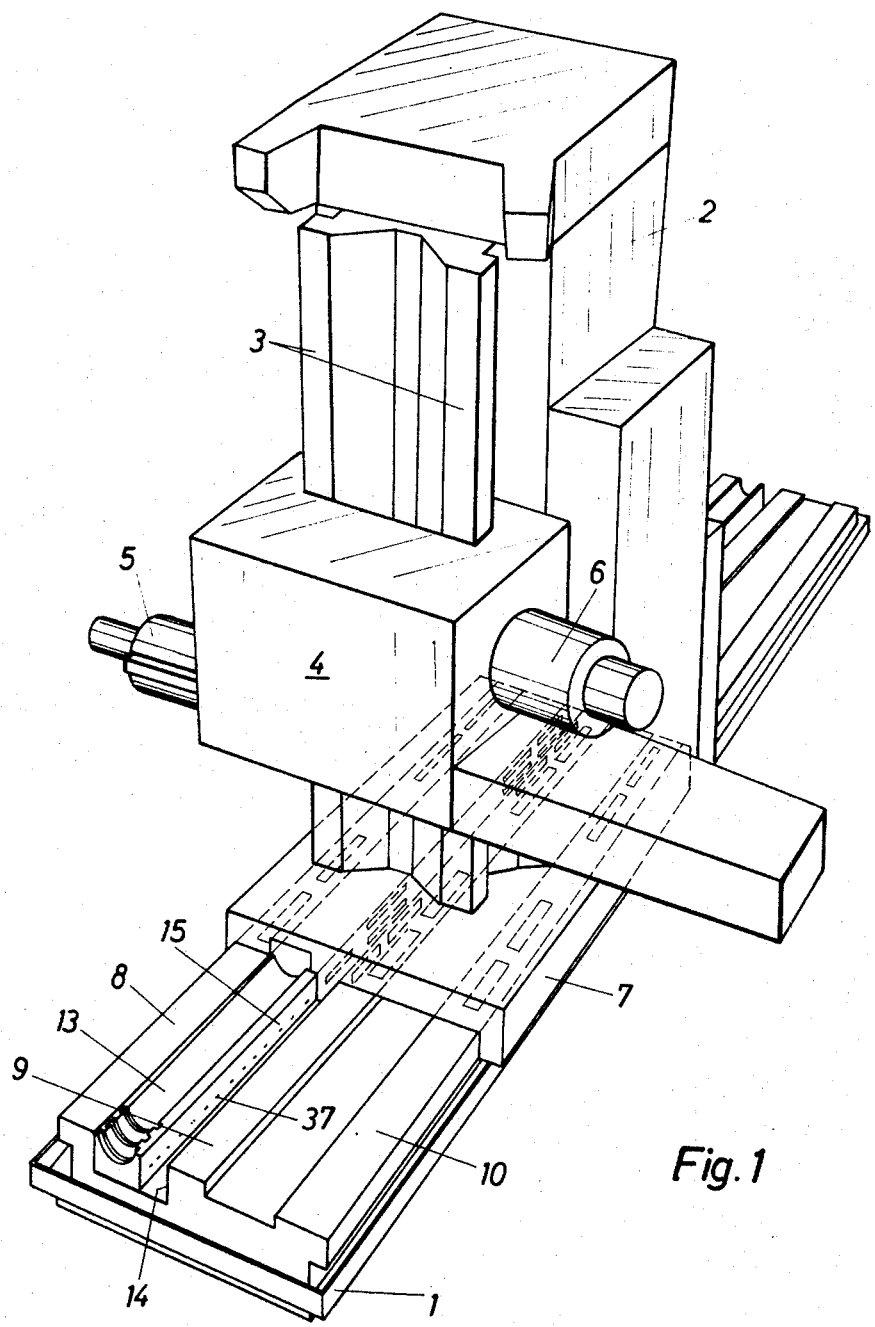
FIG. 1 illustrates the present invention by way of an isometric view of a post of a horizontal drilling and milling machine which post is longitudinally displaceable on a post bed.
Figure 2:
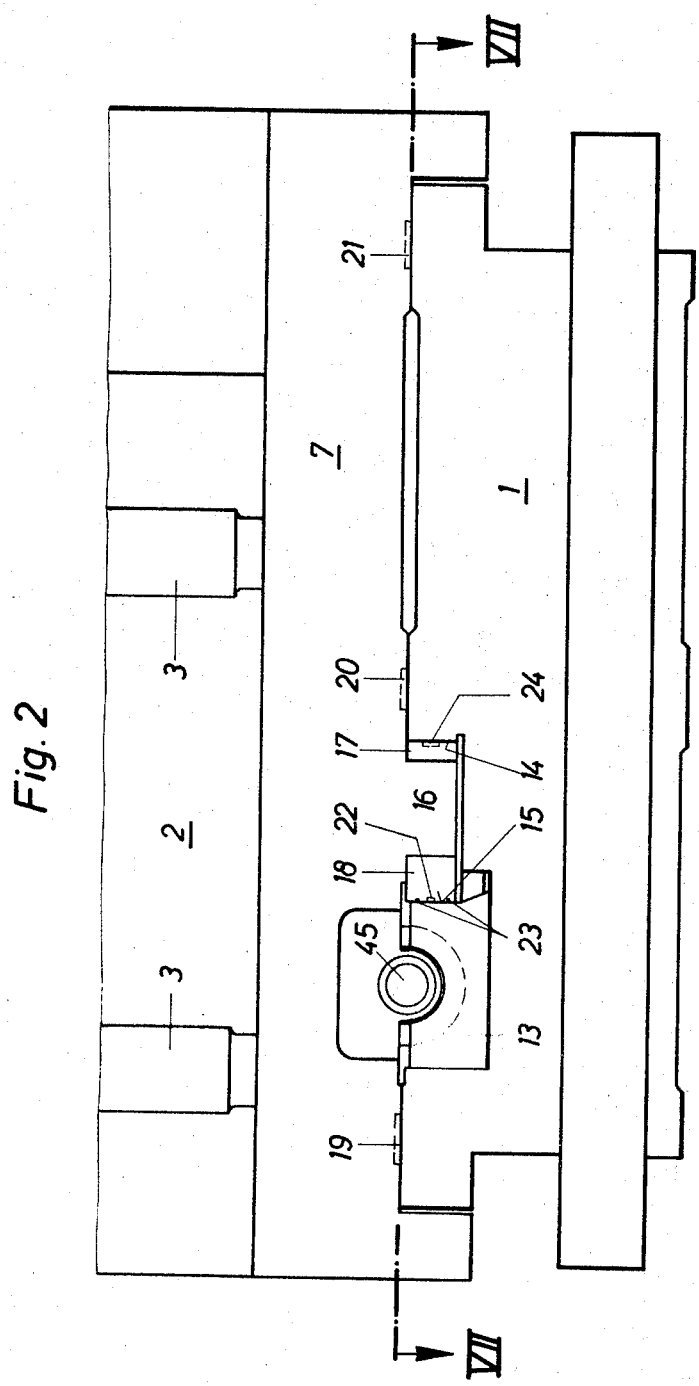
FIG. 2 illustrates on a larger scale than that of FIG. 1 an end view of the post bed and also shows the foot of the post.

Referring now to the drawings in detail, FIG. 1 illustrates an isometric view of the post bed 1 with the post 2 of a horizontal drilling and milling machine, which post is longitudinally displaceable on said bed 1. The spindle box 4 with boring bar 5 is vertically displaceable on the guiding means 3 of the post 2. For driving the tool and for the outward movement of the boring bar or spindle 5 there is provided a driving motor 6 which is arranged on the spindle box 4. The post 2 rests by means of its foot 7 on the bed 1. The foot 7 rests upon the supporting and guiding surfaces 8, 9 and 10 of the bed 1 which surfaces extend along the latter. A lateral guiding of the foot 7 is effected by the longitudinal surface 14 of bed 1 and by the oppositely located lateral surface 15 of the worm rack 13 which is firmly screwed to the bed 1. The foot 7 with the downwardly extending guiding rib 16 extends between the lateral surface 15 of rack 13 and the supporting and guiding surface 14 of bed 1 as will best be seen from FIG. 2. Rib 16 is, for purposes of engaging the surfaces 14 and 15, equipped with a guiding strip 17 and 18.

Figure 3:
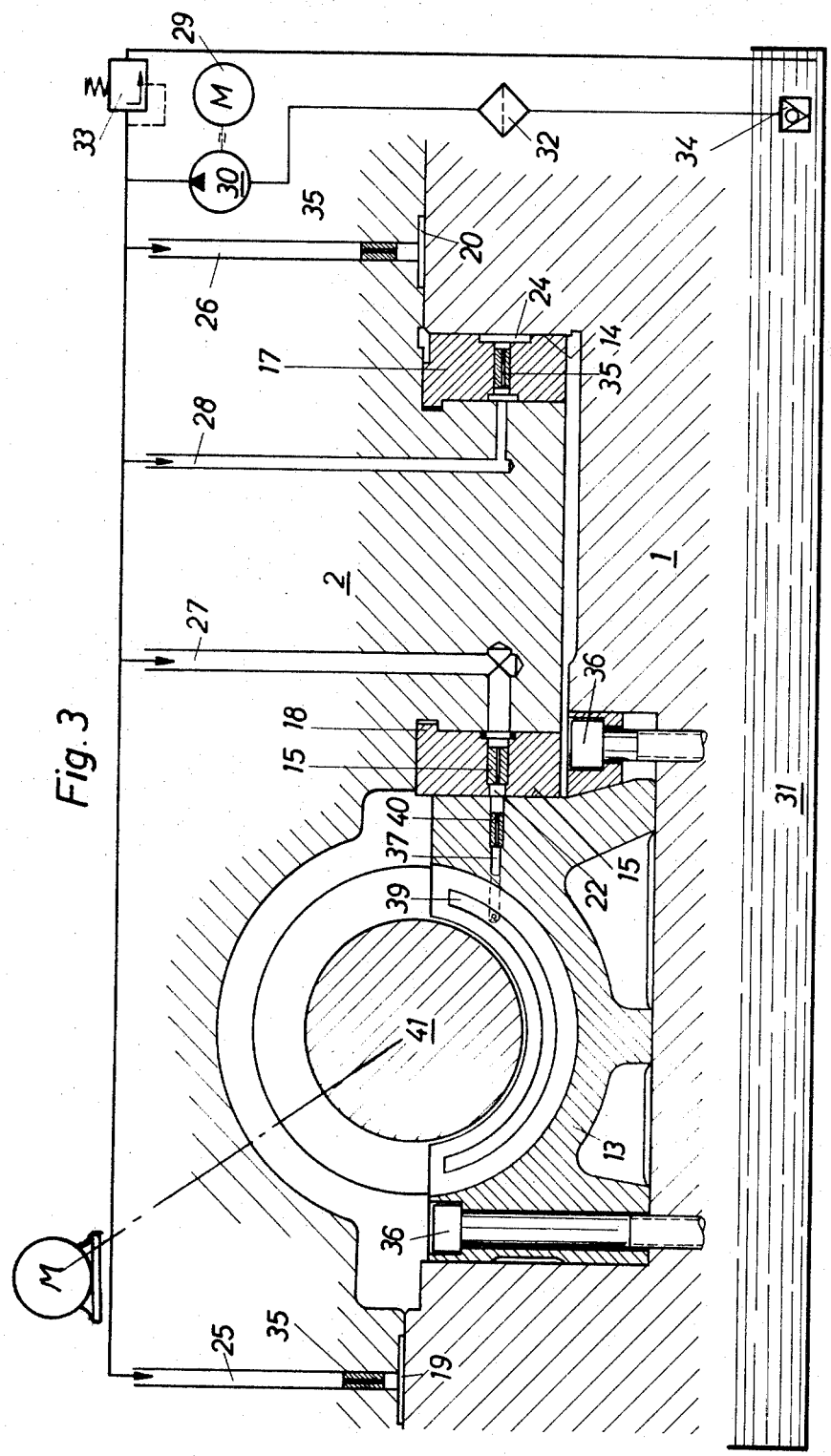
FIG. 3 illustrates on a scale larger than that of FIG. 1 a cross section through the post bed and the foot of the post in the region of the worm and also diagrammatically shows the pressure and lubricant supply system from the source of pressure fluid.

As will be evident from FIG. 3 and from FIGS. 7 to 9, the supporting and guiding surfaces 8, 9 and 10, as well as the supporting and guiding surfaces of the foot 7 and of the guiding strips 17 and 18 associated with the lateral surfaces 14 and 15 have machined therein pressure fluid pockets 19, 20 and 21, and 22, 23, and 24, which have the shape of longitudinal grooves. These pressure fluid pockets communicate through feeding passages 25–28 with the pressure fluid source. This pressure fluid source comprises a pump 30 driven by the motor 29. This pump feeds the liquid lubricant and pressure fluid from the collecting or storage container 31 to the suction basket 34 and the filter 32 to the pressure fluid pockets 19 – 24. The pressure may be set and controlled by means of the pressure control valve 33.

Figure 4:
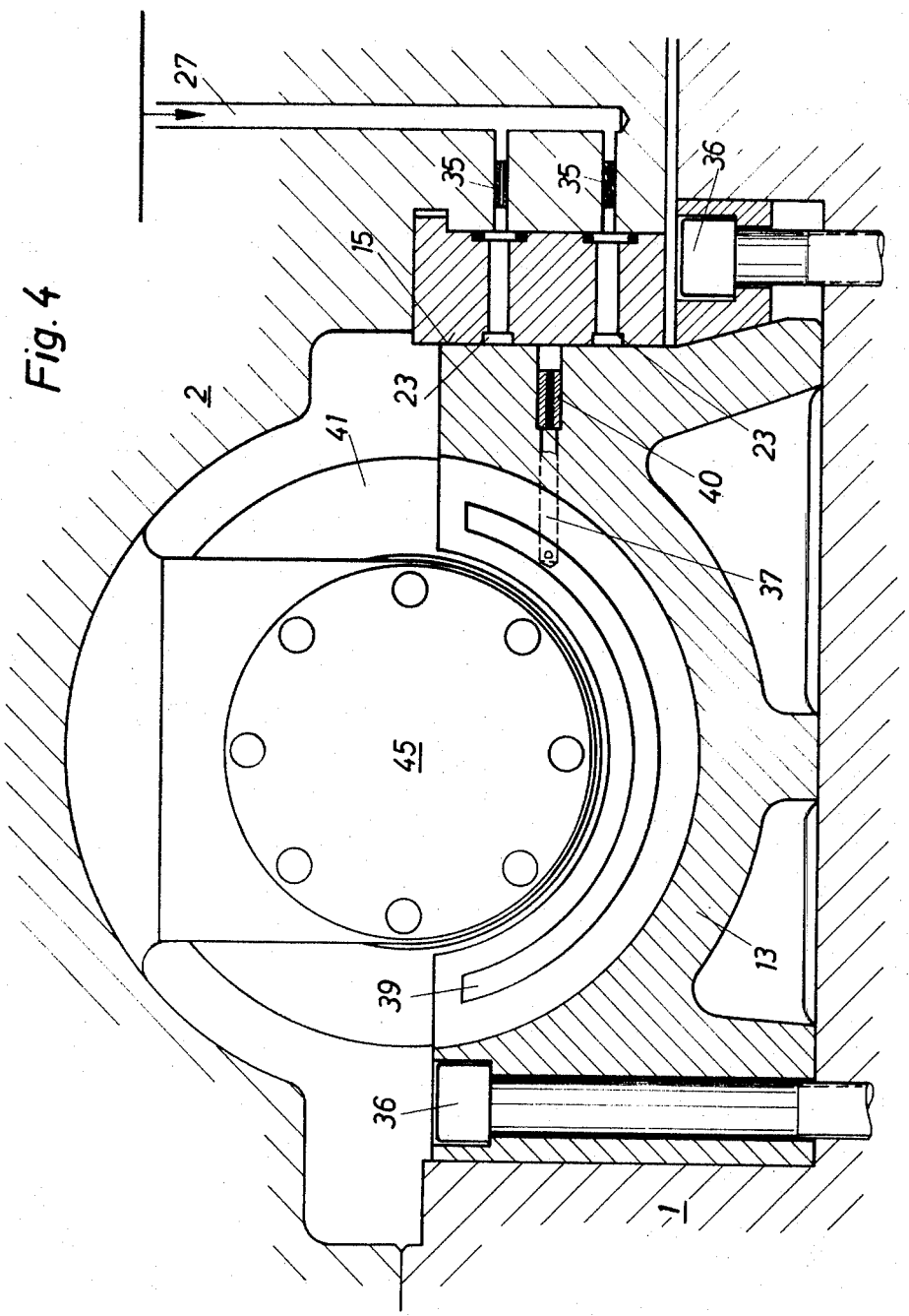
FIG. 4 represents a cross section similar to that of FIG. 3, but outside the engaging range of the worm.

As will be seen from FIGS. 3 and 4, throttles 35 are provided in the feeding passages 25 – 28 respectively which precede the pressure fluid pockets 19 – 24. The worm rack 13 which is fixedly connected to the bed 1 by screws 36 is, over its entire length, provided with transverse bores 37 which start from the lateral surface 15 and lead to the flanks of the teeth 38 of rack 13. Each tooth flank has associated therwith one bore 37. The bores 37 lead into a semicircular groove 39 in the gear flanks as is particularly clearly shown in FIG. 6 as well as in FIGS. 3 and 4. In each bore 37 there is provided a throttle 40. All of the bores 37 are located in one plane and, more specifically, at the level of the central plane of the pressure fluid pocket 22, the length of which approximately corresponds to the length of the worm 41. Worm 41 is, by means of bearings 33 and 34, together with the axial bearings 44a for the transverse forces journaled in the bearing foot 7 and is adapted to be driven through the intervention of a pinion 42 and a motor, not shown in the drawings. The pressure fluid pocket 22 is so arranged that it will be located substantially precisely opposite the worm 41, and more specifically, in such a way that in view of the selected length, only those bores 37 of rack 13 will communicate with the pressure fluid pocket 22 which lead and end in such tooth flanks of the worm gear rack 13 which are engaged by a flank of the teeth of worm 41. Outside the engaging range of the worm 41 for which the bearing support 45 is shown in FIG. 4 and which bearing support 45 receives the bearings 43 and 44, there are respectively provided two adjacent pressure fluid pockets 23. These pockets 23 are in the form of longitudinal grooves and are respectively located in such a height that they are without direct connection with the bores 37 in the gear rack 13. The pressure fluid pockets 23 thus serve for creating a lubricant cushion, but in contrast to the pressure fluid pockets 22 do not serve simultaneously to lubricate worm 41 and worm gear rack 13.

In the guiding and supporting surface of the guiding strip 17 there are likewise arranged pressure fluid pockets 24, the length of which corresponds to the pressure fluid pockets 23 while the "effective" surface of said pockets 23 corresponds to the "effective" surface of two pressure fluid pockets 23.

The above mentioned arrangement of pressure fluid pockets is illustrated in detail in FIGS. 7 to 9 while in the FIGS. 8 and 9 there are illustrated the surfaces with the pressure fluid pockets as folded toward the side.

As mentioned above, the pressure cushions generated in the pockets 19, 20 and 21 serve for vertically supporting and guiding the post or stand 2, whereas the pressure fluid pockets 22 – 24 provided in the guiding strips 17 and 18 serve for horizontally supporting and guiding the post 2 on the bed 1.

When the post 2 by driving the worm 41 and by engagement of the worm 41 with the worm gear rack 13 of the bed 1 is displaced longitudinally, the following bearing and lubricating conditions are obtained.

First, the post 2 is lifted by means of the pressure medium, for instance, oil under pressure fed by pump 30 to the pressure fluid pockets 19 – 21. At the same time, also the lateral supporting and guiding surfaces 14 and 15 of strips 17 and 18 are acted upon by lubricant and pressure fluid means which are fed by pump 30 also to the pressure fluid pockets 22 – 24. Also, worm 41 is lifted off by the thickness of a lubricant film from the gear flanks of the gears of the worm gear rack 13. The extent to which the lifting of worm 41 is effected depends on the inclination of the respective teeth which means is less than the height of the lubricant film on the guiding surfaces 8, 9 and 10 of bed 1. The lubricant passes from the pressure fluid pocket 22 through the associated bores 37 in the gear rack 13 between the flanks of worm 41 and the flanks of gear rack 13. By means of the throttles 35 in the feeding passages 27 and 28 an equalization between the lubricant pressures in the various pressure fluid pockets 22 – 24 in guiding strips 17 and 18 will be realized. The throttles are in conformity with the loss of hydrostatic guiding means and bearings so dimensioned that with the outer forces acting upon the guiding means, the displacement between the post 2 and the bed 1 as far as the lubricant film are concerned are small.

Similarly the throttles 40 inserted into the bores 37 of the worm gear rack 13 are so dimensioned that the outer forces acting in the direction of movement of post 2 will bring about only small changes in the thickness of the lubricating film between the flank of gear rack 13 and the film 41. A certain difficulty in connection with the dimensioning of the throttles consists in that by displacement within the guiding region through the strips 17 and 18, the pressure in the hydrostatic pressure fluid pocket 22 through which at the same time the lubricant and pressure fluid are conveyed to the tooth flanks of the gear rack 13, is permitted only slightly to change in order to assure that the rigidity or stiffness in the hydrostatic pressure cushions in pockets 39 of the tooth flanks will not be changed. At the same time, the pressure cushion in the pocket 22 within the region of the worm 41 together with the oppositely located pressure cushions in pressure fluid pocket 24 as hydrostatic guiding means with embrace have a stiffness which only slightly differs from the stiffness of the remaining pressure cushions. This can be obtained by corresponding dimensioning the resistance in the pressure fluid pockets and in the pertaining throttles, the ratio of the same relative to each other and by a corresponding design of the effective surfaces of the pressure fluid pockets in the guiding strips 18 and 19 and their ratio relative to each other.

It is, of course, to be understood that the present invention is, by no means, limited to the particular showing in the drawings, but also comprises any modifications within the scope of the appended claims.

What we claim is:

1. A machine tool which includes: a stationary bed having upwardly facing supporting surfaces extending in the longitudinal direction of said bed and also having sidewardly facing guiding surfaces, an upright post having a foot portion firmly connected thereto and provided with resting surfaces slidably resting on said supporting surfaces, said foot portion also being provided with surfaces facing in opposite direction with regard to each other and slidably engaging said guiding surfaces for laterally guiding said foot portion and thereby said post, a worm supported by said post and rotatably journalled thereon, motor means drivingly connected to said worm for driving the same, worm gear rack means extending in the longitudinal direction of said bed and being firmly connected thereto while meshing with said worm, one side of said rack means forming one of said sidewardly facing surfaces, said resting surfaces and said oppositely facing surfaces of said post respectively being provided with groups of groove-shaped pockets, the pockets of each group extending in the longitudinal direction of said bed and being arranged one behind the other, said one of said oppositely facing surfaces which slidably engages said one of the lateral guiding surfaces which is formed by one side of said rack means having one of its pockets arranged within the region of said worm and of a length approximately equalling the length of said worm, conduit means extending transversely through said rack, said conduit means being arranged in spaced relationship to each other and being distributed over the entire length of said rack while respectively leading to at least one flank in each tooth of said rack, said conduit means being located at the level of said one pocket so as successively to establish fluid communication between said one pocket and at least one flank in each of said rack teeth within the region of said one pocket, and throttle means arranged within said conduit means.

* * * * *